United States Patent
Hasan Hashmi et al.

(10) Patent No.: US 12,437,158 B2
(45) Date of Patent: Oct. 7, 2025

(54) METHOD FOR FILTERING AND SEMI-AUTOMATICALLY LABELING TRAINING DATA

(71) Applicant: ServiceNow, Inc., Santa Clara, CA (US)

(72) Inventors: Ziaul Hasan Hashmi, Kirkland, WA (US); Mitul Tiwari, Santa Clara, CA (US); Soham Parikh, Santa Clara, CA (US); Quaizar Vohra, Santa Clara, CA (US); Jignesh Parmar, Santa Clara, CA (US); Shounak Purkayastha, Santa Clara, CA (US); Anil Madamala, Santa Clara, CA (US); Patrice Bechard, Montreal (CA); Orlando Marquez, Montreal (CA); Olivier Nguyen, Montreal (CA); Srivatsava Daruru, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 243 days.

(21) Appl. No.: 18/354,247

(22) Filed: Jul. 18, 2023

(65) Prior Publication Data
US 2025/0028910 A1   Jan. 23, 2025

(51) Int. Cl.
G06F 40/40 (2020.01)
G06F 16/355 (2025.01)
G06F 40/35 (2020.01)

(52) U.S. Cl.
CPC ............ *G06F 40/40* (2020.01); *G06F 16/355* (2019.01); *G06F 40/35* (2020.01)

(58) Field of Classification Search
CPC ........ G06F 40/40; G06F 16/355; G06F 40/35; G06F 40/30
See application file for complete search history.

(56) References Cited

U.S. PATENT DOCUMENTS

| | | | |
|---|---|---|---|
| 4,941,084 A | 7/1990 | Terada | |
| 5,185,860 A | 2/1993 | Wu | |

(Continued)

FOREIGN PATENT DOCUMENTS

| | | |
|---|---|---|
| EP | 0433979 A2 | 6/1991 |
| EP | 1607824 A2 | 12/2005 |

(Continued)

OTHER PUBLICATIONS

ServiceNow, Tokyo Now Intelligence, Mar. 24, 2023.

*Primary Examiner* — Linda Wong
(74) *Attorney, Agent, or Firm* — McDonnell Beohnen Hulbert & Berghoff LLP

(57) ABSTRACT

A method is provided for efficiently providing sentiments or other manual labels for textual training data. The method includes using an embedding model to project acquired user text to an embedding vector in an embedding space. Distances (e.g., cosine similarities) between this embedding vector and the embedding vectors determined for a plurality of already-label user text training examples are then determined. The already-labeled user text that has the shortest distance is determined and the label thereof is prospectively applied to the acquired user text and presented to a user for approval. The user can approve the prospectively applied label, in which case the newly acquired text is added to the training data with the prospectively applied label associated therewith for later use in training a language model. Alternatively, the user can decline the prospectively applied label and apply an alternative label to the newly acquired text.

18 Claims, 7 Drawing Sheets

(56) References Cited

U.S. PATENT DOCUMENTS

| | | |
|---|---|---|
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway et al. |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Joe |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,060,396 B1 | 11/2011 | Bessler |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 9,053,460 B2 | 6/2015 | Gilbert |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B1 | 5/2021 | Bar Oz |
| 11,025,481 B1 | 6/2021 | Louca |
| 11,037,549 B1 | 6/2021 | Kulkarni |
| 11,089,115 B2 | 8/2021 | Garty |
| 11,095,506 B1 | 8/2021 | Erblat |
| 11,275,580 B2 | 3/2022 | Tamir |
| 11,277,475 B1 | 3/2022 | Tal |
| 11,281,442 B1 | 3/2022 | Tal |
| 11,296,922 B2 | 4/2022 | Leibkowiz |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0095461 A1 | 5/2006 | Raymond |
| 2006/0179058 A1 | 8/2006 | Bram |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2010/0110932 A1 | 5/2010 | Doran |
| 2016/0055240 A1 | 2/2016 | Tur |
| 2018/0123940 A1 | 5/2018 | Rimar |
| 2019/0073257 A1 | 3/2019 | Dasgupta |
| 2019/0104398 A1 | 4/2019 | Owen |
| 2019/0384813 A1 * | 12/2019 | Mahmoud ............ G06F 40/289 |
| 2020/0050689 A1 | 2/2020 | Tal |
| 2020/0204443 A1 | 6/2020 | Bar Oz |
| 2020/0301678 A1 | 9/2020 | Burman |
| 2021/0194764 A1 | 6/2021 | Badyan |
| 2022/0029886 A1 | 1/2022 | Hameiri |
| 2022/0237383 A1 | 7/2022 | Park |
| 2023/0267175 A1 * | 8/2023 | Jain ..................... G06F 18/22 |
| | | 706/15 |

FOREIGN PATENT DOCUMENTS

| | | |
|---|---|---|
| WO | 9934285 W | 7/1999 |
| WO | 0052559 W | 9/2000 |
| WO | 0179970 W | 10/2001 |

* cited by examiner

METHOD FOR FILTERING AND SEMI-AUTOMATICALLY LABELING TRAINING DATA

BACKGROUND

Natural Language Processing (NLP) models or other large machine learning models can be trained to perform their intended task(s) using a large sample of training data. Such a source of training data often continues to generate additional potential training data after the initial model training process is complete. For example, in examples where user comments on an Internet or other online forum are used to train a language model, additional comments may continue to be made on the forum following use of the comments to train the model. It can be beneficial to either periodically train an updated model based on the expanded set of training data and/or to update a previously-trained model using the newly-added training data. This can be done so that the updated model reflects any changes in the underlying training data that may occur over time (e.g., changes in the use or meaning of words, addition of novel words or concepts, changes in the natural distribution of use of words or topics). However, such a model updating process may be expensive with respect to the computational resources needed (e.g., to collect and process new training data and to repeatedly perform the model training process) and other resources (e.g., human effort to provide labels, bounding boxes, or other information for individual examples within newly-acquired training data).

SUMMARY

Over time, systems can change. For example, the types of words used, the meanings of those words, and the types of problems typically encountered when describing, communicating about, or otherwise working with an information technology environment can change over time. Accordingly, it can be beneficial to update natural language processing (NLP) models or other trained models used in combination with such systems, so that these models continue to reflect these systems as they change, rather than as they once were in the past.

Training such models can include using a very large amount of training data. Such data can come from a variety of sources. In many scenarios, there is a source of unlabeled training data that is readily and cheaply available but that is relatively more expensive to properly label or otherwise process for use in training a model. For example, a great deal of textual data may be produced by capturing text input by users in chat windows (e.g., as part of chatting with virtual or real agents for technical support). However, this textual data is generated in an unlabeled manner (e.g., includes only the text and does not include sentiment labels or other label data). Manually providing labels for such data, so that they can be used to train a model, can be time-intensive and expensive.

The embodiments described herein provide improved methods for facilitating labeling of user text (e.g., providing sentiment labels for text). Some of these embodiments include predicting a suggested label for text examples and then presenting a user with the text and the predicted label. The user can then accept the predicted label (so that the text can then be added to a training dataset with the predicted label) or reject it in favor of another label. Providing a predicted label to the user can significantly reduce the amount of time used to label a set of text. Additionally, since a human labeler will confirm (or deny) the predicted labels, a less accurate but computationally less expensive label prediction method can be used. For example, a particular user text could be applied to an embedding model to generate therefor a representative embedding vector in an embedding space. Distances between the embedding vector and embedding vectors for already-labeled user text can then be determined. The closest one of the already-labeled user texts could then be determined based on the distances and the label of the closest user text prospectively applied to the particular user text. This prospective label could then be presented to a human labeler, along with the particular text, to allow the human labeler to accept the prospective label or to select an alternative label. The use of such a prospective label generation method can exhibit significant computational savings relative to alternative methods. Additionally, embedding models used to generate such embedding vectors can be easier to generate (e.g., using unlabeled data in an unsupervised manner, using large amounts of available labeled data from unrelated training datasets) or otherwise obtain.

Embodiments for user text labeling described herein can also reduce the amount of time used to label user text by pre-filtering the user text to select segments of user text that are most likely to represent valuable data for model training purposes. For example, where the user text is obtained from chat logs, then user text that represents invitations, pleasantries, affirmation or negation, requests for clarification, or other 'routine' and relatively non-informative parts of a conversation may be discarded, prioritizing human labeler efforts on more informative segments of user text. This can include applying a dialog act model or other model to the set of user text in order to predict which segments of user text represent such non-relevant content and which segments do not (and so should be labeled by a human labeler). In additional to reducing the human labeler time by reducing the number of segments of user text to be labeled, such a filtering process can reduce the computational costs of storing the user text (by discarding much of the non-informative text) and of performing computation related to the user text (by reducing the amount of user text applied to the embedding model to predict a prospective label therefor).

Accordingly, a first example embodiment may involve a method that includes: (i) obtaining user text; (ii) applying an embedding model to the user text to generate an embedding vector in a vector space, wherein the embedding model was trained to generate respective embedding vectors for training data sets, and wherein the training data sets include a plurality of textual training examples each with respectively associated class labels; (iii) identifying a particular textual training example, of the plurality of textual training examples, whose associated embedding vector is closest in the vector space to the embedding vector that is associated with the user text; (iv) providing an indication of the user text and a class label respectively associated with the particular textual training example; (v) receiving a response that the class label correctly classifies the user text; and (vi) in response to receiving the response, training a production model using the user text associated with the class label.

A second example embodiment may involve a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
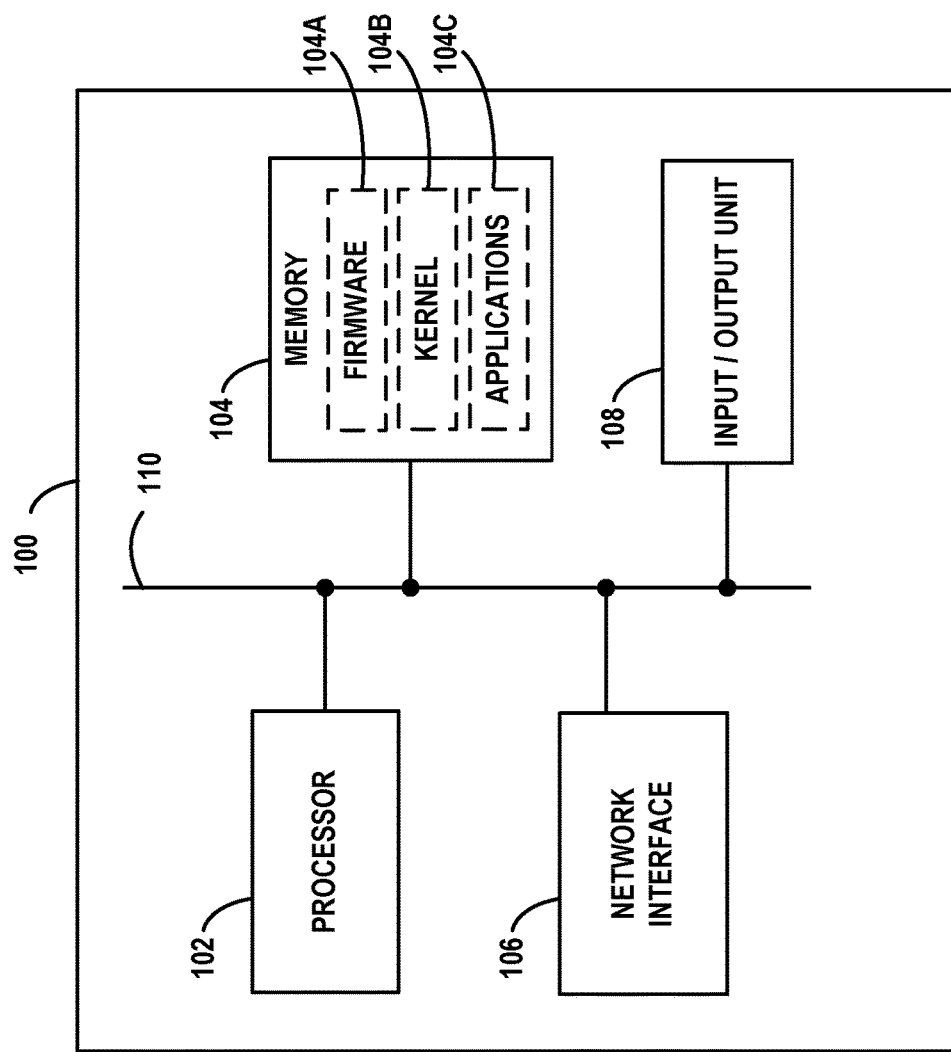
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
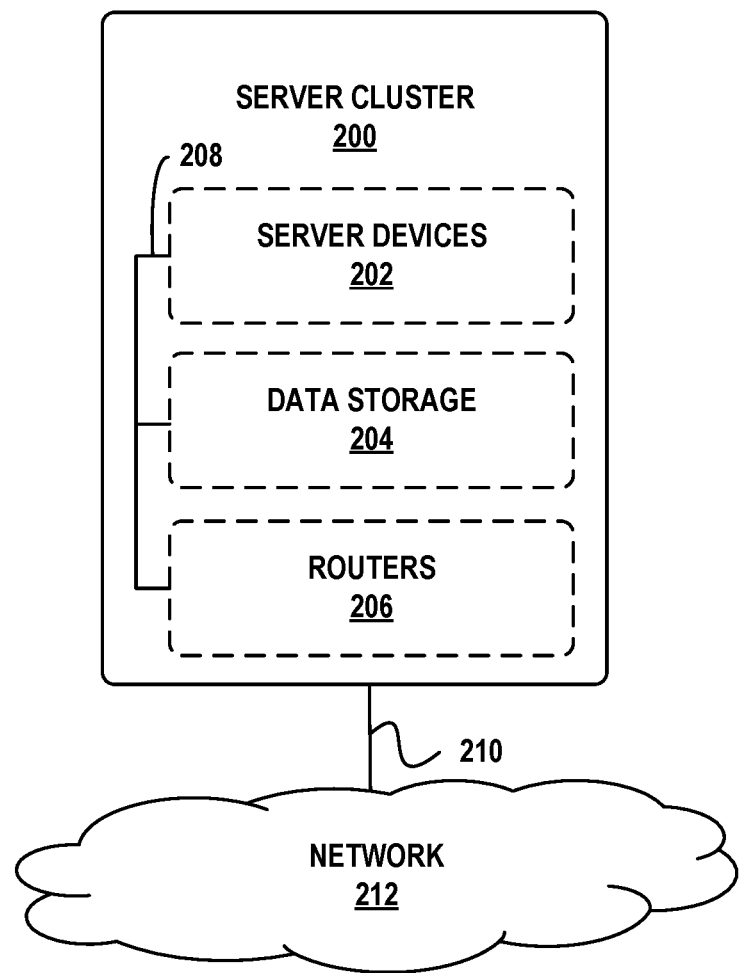
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
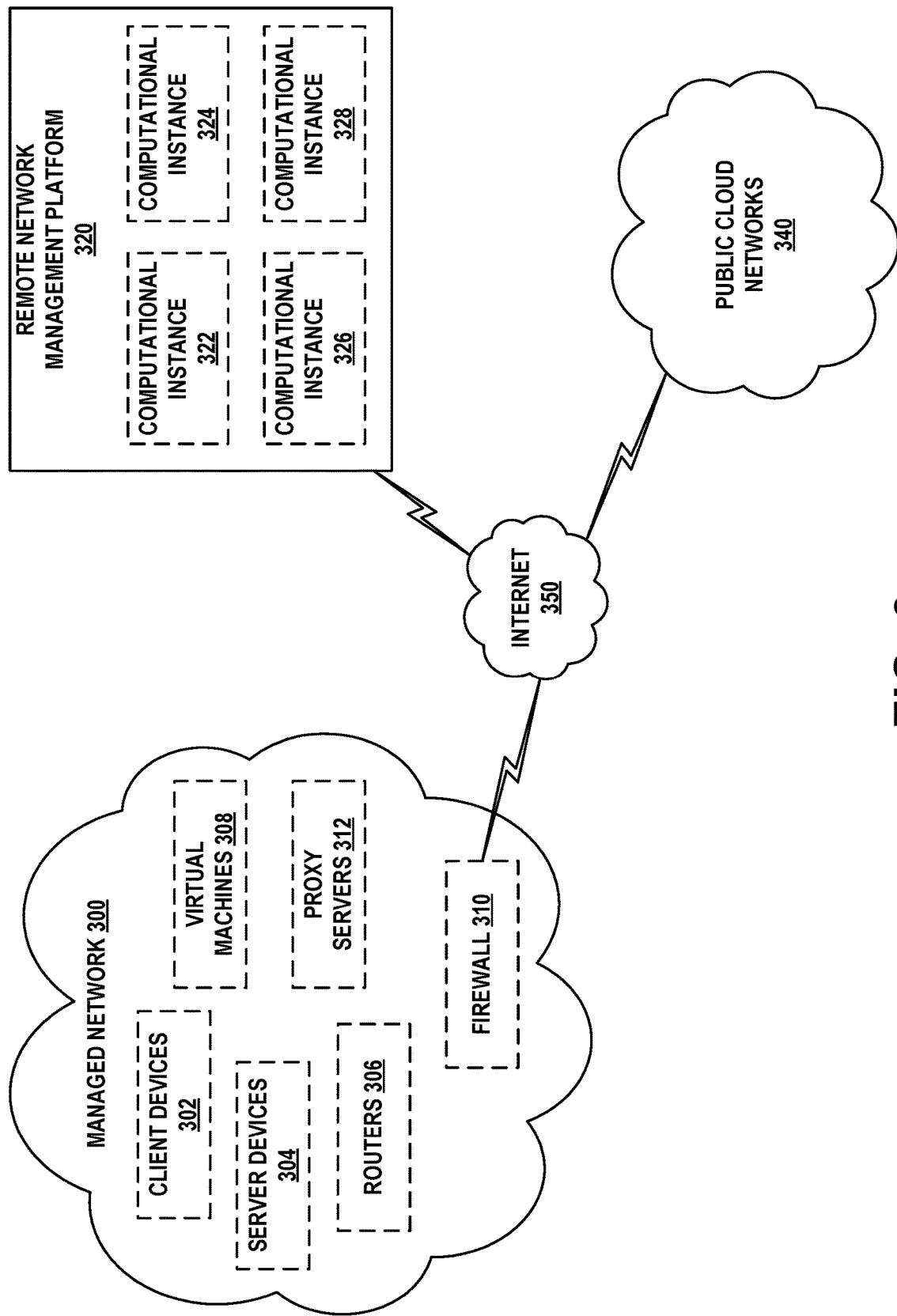
FIG. 3 depicts a remote network management architecture, in accordance with example embodiments.

FIG. 3 depicts a remote network management architecture, in accordance with example embodiments. This architecture includes three main components-managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
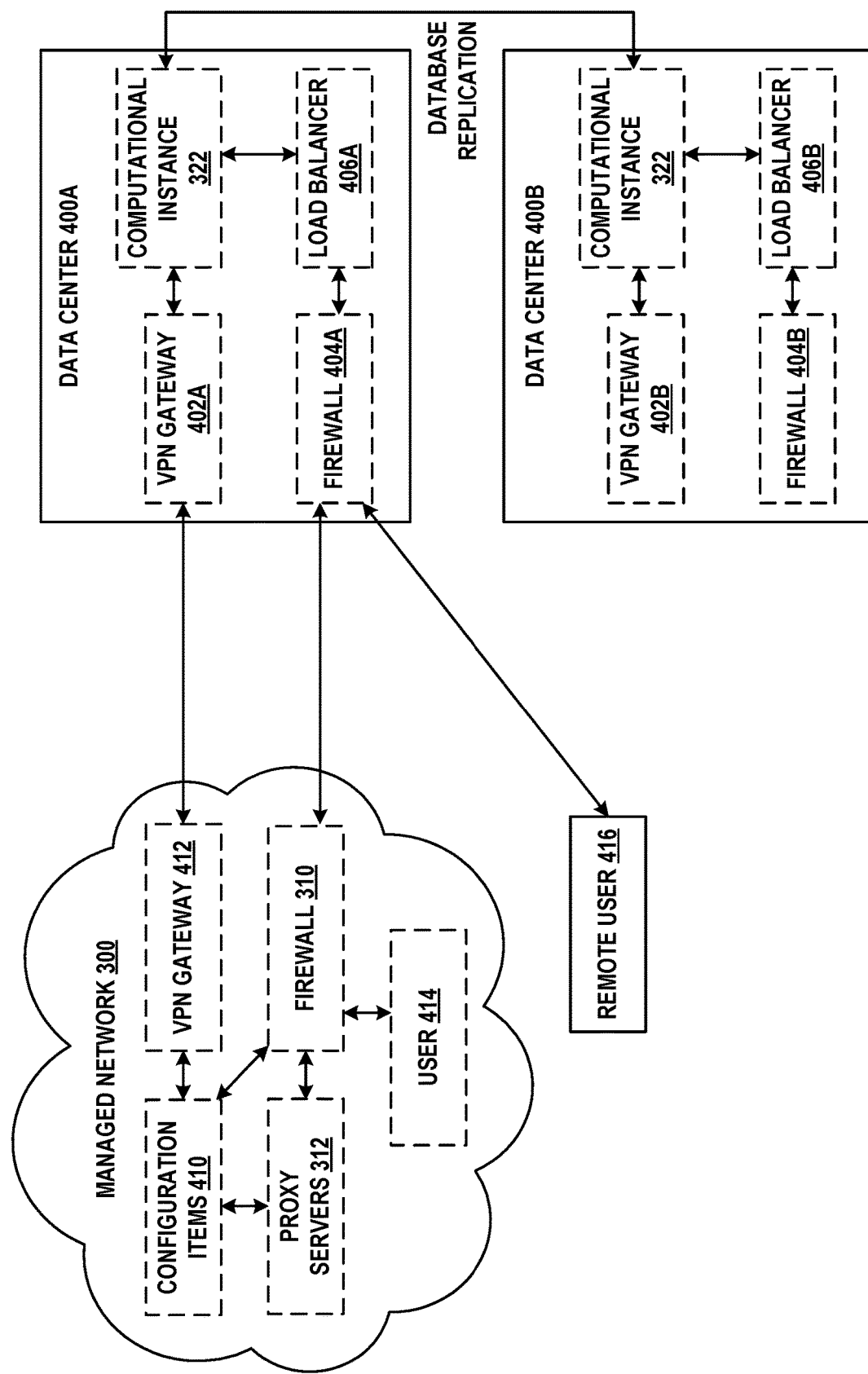
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. EXAMPLE DISCOVERY

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
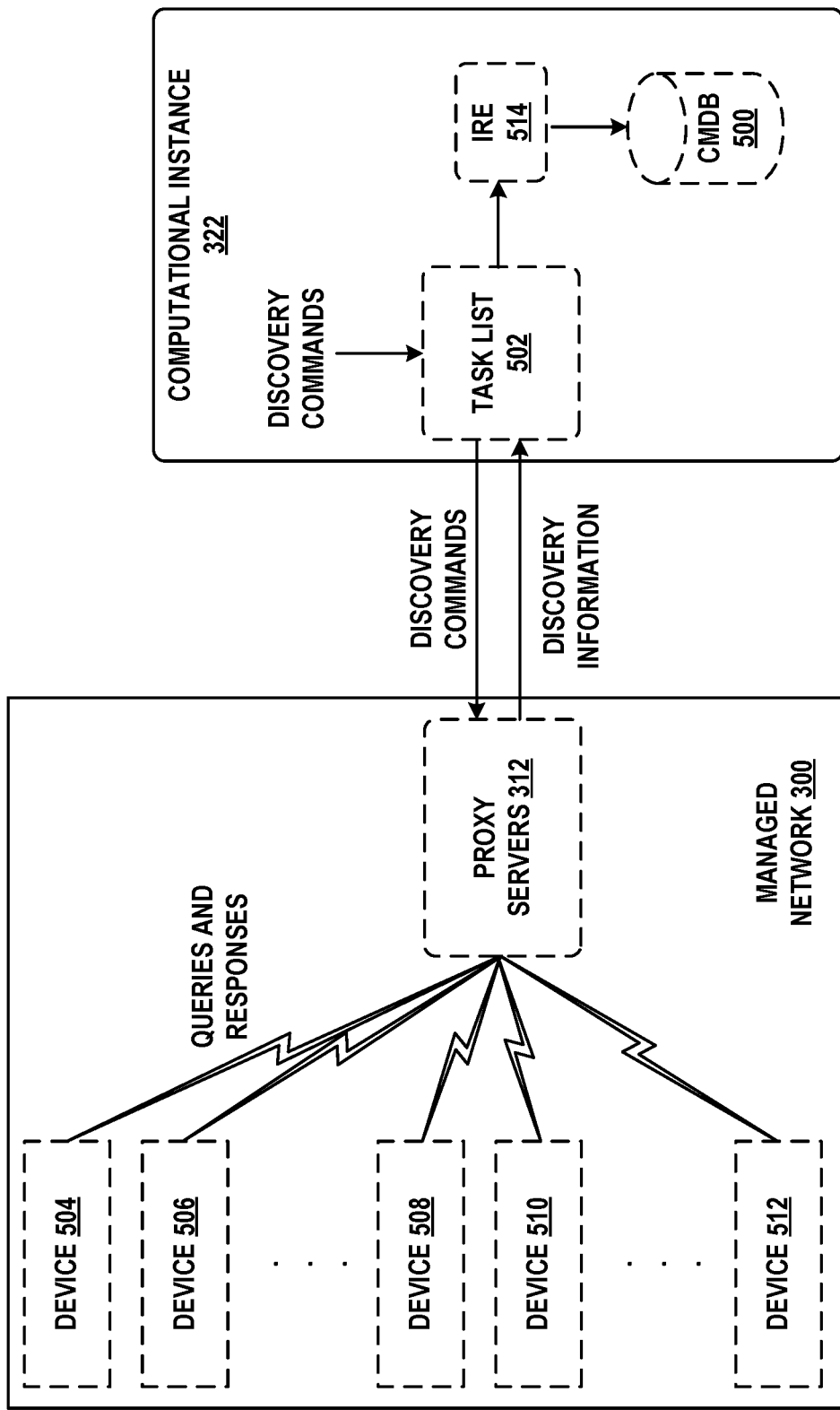
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®—10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB IDENTIFICATION RULES AND RECONCILIATION

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. EXAMPLE TEXT LABELING

In order to train a large language model or other machine learning model, a large amount of training data may be needed. There are many scenarios in which a large amount of raw training data can be obtained. For example, where users interact with each other or with automated systems via text chat, the user text generated as part of the text chat can be stored for use as part of a training dataset. However, in order to use such user text to train a model to predict class labels for novel textual inputs, some or all of the examples in the training dataset will require labels to be generated therefor.

Labels can be generated for user text (e.g., labels indicative of sentiment represented by the text) in a variety of ways. Human experts can be employed to label user text; however, this can be very expensive with respect to the human expert time needed to do so. Such expense is magnified for tasks where more training data is needed (e.g., to train a larger model, or to obtain an more accurate model) and/or where models are repeatedly re-trained to reflect changes over time in the system being modeled (e.g., to reflect changes in word use, word meanings, common technical problems experienced, or other changes in the operation and interaction of a managed network environment or other information technology system).

Semi-supervised training can 'bootstrap' a relatively smaller number of labeled training examples into a larger number, but accurate semi-supervised training still requires a large number of 'correct' human-labeled training examples. However, models trained in an unsupervised or semi-supervised manner are more likely to perform poorly on the most 'difficult' unlabeled training examples and/or training examples that fall outside of the context represented by the available labeled training examples (e.g., that represent previously unobserved word uses or meanings or technological concepts or problems).

Embodiments herein provide improvements to manual labeling of unlabeled user text (or other training data examples) by first using available labeled training examples to predict a class label for unlabeled user text. This predicted class label is then provided to a user (e.g., a manual labeler or some other individual tasked with generating 'ground truth' labels for unlabeled user text training data) along with the associated user text. The user can then accept or deny the predicted class label. If the class label is accepted by the user as correctly classifying the associated user text, the predicted label and text data associated therewith are added to a training dataset. Alternatively, if the user rejects the predicted class label, the user could indicate a 'correct' class label for the user text. The training dataset, with additional user text and associated class labels added thereto, can then be used to train a production model (de novo, by fine-tuning a generic model, and/or by using the newly obtained training data to update a production model that had been previously trained).

Incorporating a human user into the loop to confirm or reject predicted class labels for training data allows less accurate, and correspondingly potentially less computationally expensive, prediction methods to be applied to generate the predicted class labels. This is because the lowered accuracy of the method for prediction can be compensated for by the human review. However, the provision of a reasonably accurate predicted class label to the human labeler can significantly reduce the amount of human time and effort needed to label a set of training data, since in many cases the human labeler's efforts will be reduced to simply 'accepting' the predicted class label for training examples where that predicted label is correct. For a training example whose predicted class label is incorrect, the human labeler could provide an alternative class label for the training example (e.g., from a drop-down menu or other UI element representing an enumerated set of possible classes) and/or could simply reject the training example entirely, such that it is not added to the labeled training dataset.

One example of a less computationally expensive prediction method includes using an embedding model to generate, for a sample of user text, an embedding vector that represents the user text in an embedding space. Distances between this target embedding vector and embedding vectors determined for a set of already-labeled training examples (e.g., fully manually-labeled training examples and/or training examples labeled in the prediction-assisted manner described herein) could then be determined. The labeled training example that is closest to the target embedding vector with respect to the determined distances could then be determined, and the class label of that training example prospectively applied to the user text. A human labeler or other user could then be presented with the user text and the predicted label and allowed to accept or reject the predicted label. Such a label prediction method can be less computationally expensive than alternative prediction methods. For example, this method can be less computationally expensive than determining an embedding vector for user text and then apply that embedding vector to additional models (e.g., one or more neural networks) to determine class probabilities for an enumerated set of classes and then selecting, as the predicted class label, the class label that corresponds to the highest determined class probability.

Figure 6:
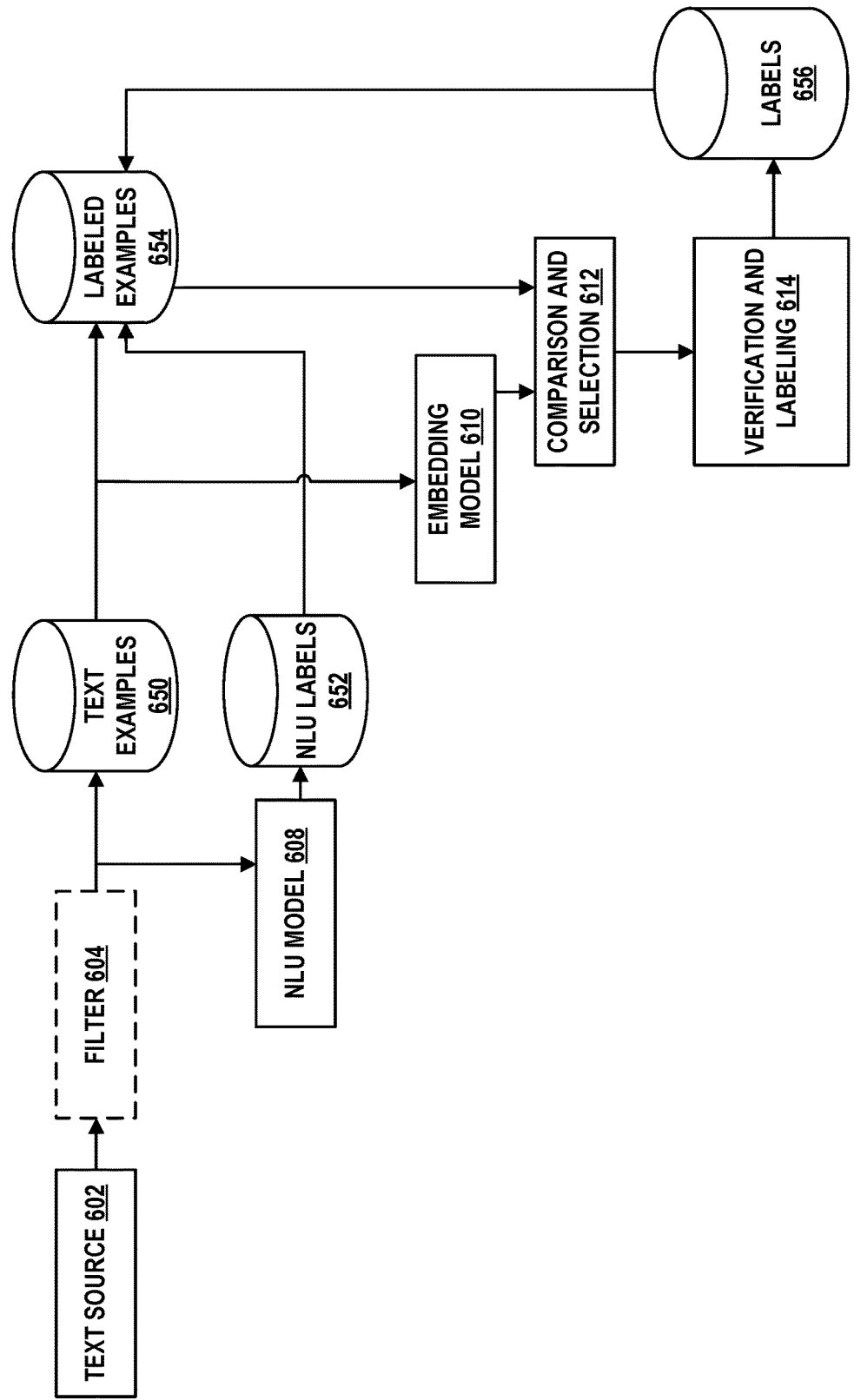
FIG. 6 depicts aspects of a training example filtering and labeling method, in accordance with example embodiments.

FIG. 6 depicts aspects of such an augmented text-labeling method. A text source 602 (e.g., user chats via a support interface or other communications channel with human or virtual support agents) provides instances of user text that can be stored in a set of text examples 650 for later labeling and then used, with the labels, to train production models (e.g., large language models used as part of a virtual agent, one or more of the embedding or other models used to implement the methods described herein). The user text obtained from the text source 602 may optionally be filtered by filter 604 prior to storage and/or labeling. Such filtering could be performed to remove redundant, non-informative, or otherwise unwanted user text like salutations, confirmation/denial messages, or other unwanted types of user text.

Some portion of the user text may be applied to a natural language processing (NLU) model 608, and as a result may have generated therefor associated NLU labels 652. This could be done as part of the operation of a virtual agent to respond to a user, due to computational resources being temporarily available (e.g., due to transient reductions in system use), due to the user generating the texts having subscribed to a level of service that includes the operation of the NLU model 608 for some purpose. In some examples, user text having such an NLU label 652 may be added to a training dataset of labeled training examples 654. This could be done, e.g., if a level of confidence in the NLU label for a particular user text is determined to be high. This could include determining that a likelihood and/or probability of the determined NLU label is greater than a specified threshold.

User text from the set of text examples 650 is applied to an embedding model 610 to generate embedding vectors therefor in a representative embedding space. This process could be done for a particular example of user text in response to determining that the particular user text is not already associated with an accepted NLU label 652 and/or has not already been added to the set of labeled examples 654 in associating with such an NLU label 652. A comparison and selection process 612 includes determining distances between the target embedding vector for the particular user text and embedding vectors for the labeled user text examples in the labeled examples 652, and then selecting the already-labeled user text whose distance to the target embedding vector is lowest. The class label of this selected already-labeled user text is then prospectively applied to the particular example of user text.

The particular user text and prospective class label are then presented to a user (e.g., a human labeler) as part of a verification and labeling process 614. This could include, e.g., presenting indications of the particular user text and predicted class label in a GUI. Such a GUI could be could be provided by a web server via HTML or some other internet connection or protocol, as part of an app or some other purpose-built program, or in some other manner. Such a GUI could include buttons or other means for receiving, from the user, an indication that the predicted class label is correct (or incorrect). Such a GUI could also include means (e.g., a drop-down menu, a text input box) for the user to select an alternative class label for the particular user text, e.g., an alternative class label selected from an enumerated set of class labels and/or a novel free-form class label input by the user. Labels 656 received from the user (either accepted 'correct' predicted class labels, or user-selected or input alternative class labels) can then be added, with their associated user text, to the labeled examples 654 for use in training production models (e.g., updating production models) or some other use. For example, the labeled examples 654 could be used to fine-tune, update, or otherwise train the NLU model 608 and/or the embedding model 610. Such labeled user text could also be added to the set of labeled examples 654 used to predict class labels for subsequent examples of user text that can then be approved/denied by a human labeler.

The embedding model 610 could include a variety of different model elements or architectures to receive input user text and output therefor embedding vectors in an embedding space. For example, the embedding model 610 could include a transformer whose output tokens are combined via a pooling process to generate the embedding vector. The embedding model 610 could be trained in a variety of ways based on a variety of different sources of training data. For example, the embedding model 610 could be trained in an unsupervised, supervised, or semi-supervised manner on a large set of generic text data (e.g., a corpus of text culled from internet forums, websites, literature, and/or other sources of text from one or more languages) and/or specific data relevant to a particular application (e.g., text related to the operation of an information technology network environment). In some examples, the embedding model 610 could initially be a generic model trained using generic text data and then subjected to fine-tuning using more application-specific training data (e.g., text related to the operation of a specific information technology network environment that will generate additional user text to be labeled). A generic model, trained on relatively more easily-obtained generic training data, can be used since the embedding output thereby need only separate dissimilar text in the embedding space to a greater degree than it separates dissimilar text.

The distances between embedding vectors could be determined in a variety of ways. For example, the distances could be determined as cosine similarities, L1 distances, L2 distances, or some other distance-like metric. Comparison of the distances to determine the 'closest' already-labeled training example could include determining the approximate nearest neighbor via computationally-efficient methods in order to reduce computational costs, particularly for large libraries of already-labeled text examples and associated embedding vectors, such as by using one or more methods of the Facebook AI similarity search (Faiss) library.

As noted above, a filter 604 may be used to filter out user text that is redundant, non-informative, or otherwise unwanted, thereby saving on storage of such user text and/or the computational cost of applying the classification and validation methods described herein. For example, such filtering could remove user texts like "I agree," "sounds good," "show me more," "repeat that," etc. Filtering could additionally or alternatively be used to remove personal identifiable information (PII) from the text in order to preserve the privacy of such information that may be present in the text. This could include identifying and removing email addresses, locations, names, postal codes, identification numbers (e.g., employee ID numbers), or other PII.

Such filtering could be accomplished in a variety of ways. For example, a model could be trained to receive a single sample of user text and, from that input, predict wither the sample of user text should be retained or rejected for labeling and further use. Additionally or alternatively, a dialog act model or other type of model could operate on sequences of samples of user text, using the context of previous and/or subsequent samples of user text in an ongoing dialog to identify a class of 'dialog act' for each of the segments of user text. Each segment of user text could be a complete user comment or a portion thereof (e.g., a clause, a sentence). If the dialog act model determines that a sample of user text is informative or otherwise relevant (e.g., by determining that the user text is likely outside the context of the different non-informative dialog acts that the model has been trained to identify), then the user text could be retained for labeling via the methods described herein.

Such a dialog act model could be configured in a variety of ways. In some examples, the dialog act model could generate a set of outputs based on an input sample of use text, with each output representing the probability or likelihood that the input text is a part of a respective dialog act class. Based on such a set of probabilities or likelihoods, a particular example of user text could be determined to be outside the context of the dialog act model (and thus sufficiently informative to be retained for manual and/or automated labeling and addition to a training dataset) if all of the probabilities/likelihoods in the set are below a specified value, e.g., less than a probability/likelihood of 0.6 or another value. Additionally or alternatively, a particular example of user text could be determined to be outside the context of the dialog act model if the determined probability/likelihood output by the model for an "out of context" dialog act class is the highest probability/likelihood in the set of determined probabilities/likelihoods.

The table below illustrates a variety of dialog act classes that such a model could predict, along with brief descriptions of each class and examples of each class:

| Dialog Act | Description | Example 1 | Example 2 |
|---|---|---|---|
| da_abort | User to stop a virtual agent (VA) suggestion/action | "I wish to discontinue" | "I want to abort" |
| da_affirm | User to say yes to a VA suggestion/action | "I agree" | "sounds good" |
| da_cant-understand | User to convey confusion at VA suggestion/action | "can you clarify" | "unable to understand" |
| da_deny | User to deny VA access to something | "I cant give" | "I am not willing to provide this" |
| da_go-back | User to direct VA to repeat previous suggestion/action | "go to the previous" | "the last one" |
| da_hold | User requesting time from VA | "hold on" | "can i get back to you after checking" |
| da_modify | User to direct VA to change a field entry | "can you go back and change my #firstvariable to #firstvalue" | "modify it to firstvalue" |
| da_negate | User to turn a VA suggestion/action down | "no" | "not interested" |
| da_repeat | User to ask VA to reiterate suggestion/action | "repeat that" | "Can you please say it again" |
| da_request | User to ask VA to show a specific field or entry | "show me my #firstvariable" | "tell me my name" |
| da_restart | User to ask VA to retry previous suggestion/action | "refresh it" | "start from the beginning" |
| da_show_more | User to ask VA to expand suggestions | "show me more" | "i want to see something else" |
| da_skip | User to ask VA to skip over current suggestion/action | "Ignore it" | "I want to skip" |
| small_talk | Conversation openers with VA | "good morning" | "thanks a ton" |
| st_end_conversations | Conversation endings with VA | "bye" | "goodbye" |
| st_feedback | Conversation endings to provide feedback for VA experience | "I want to give a review" | "i give you a bad rating" |
| st_greetings | Conversation openers with VA | "hi there" | "hey" |
| st_live_agent | User requests to switch from VA to live agent | "i want a human" | "please transfer to agent" |
| st_show_notification | Request to VA to list user notifications | "List notifications" | "Pending notifications" |
| st_what_can_you_do | Open ended request to list VA functionalities | "explore capabilities" | "what else can you do" |
| out_of_domain | Irrelevant, out of domain requests to VA | "new york city became the largest city in the united states by what date" | "fetch me the wikipedia article on autophagy" |

Such a dialog act model could be trained in a variety of ways using a variety of training datasets. Since the dialog act model only needs to predict whether input text is one of a number of relatively non-informative parts of an overall dialog (e.g., affirmations, negations, requests for additional information or clarification), and optionally to predict that input text is explicitly outside the context of the enumerated set of non-informative classes of an overall dialog, the dialog act model can be trained using generic dialog training datasets. Such generic training datasets are relatively larger and/or more easily obtained relative to dialog training datasets that are more specific to a particular application (e.g., to the sorts of dialog that are likely to be encountered within the operations and functioning of a particular information technology network environment or system).

VII. EXAMPLE TECHNICAL IMPROVEMENTS

These embodiments provide a technical solution to a technical problem. One technical problem being solved is generating class labels for samples of user text or other readily available unlabeled training data. In practice, this is problematic because, to obtain high accuracy in such semi-supervised labelling operations, computationally expensive models trained on extremely large training datasets may be required. Instead, the embodiments described herein use trained models to suggest possible class labels for user text (or other training data samples) that are then manually accepted or declined (e.g., in favor of an alternative user-selected class label) by a human labeler or other user. Since the user acts to verify the predicted class labels, less accurate models, which may be computationally less expensive to store and/or execute and which may have been trained on smaller and/or lower-quality training datasets, may be used.

Additionally, the embedding vector method for generating such predicted class labels exhibits reduced computational cost relative to alternative prediction methods. This is because determining distances (e.g., cosine similarities) between embedding vectors and then selecting the 'closest' distance can be performed using limited computational resources (e.g., memory use, computational cycle use) than alternative methods like providing an embedding vector further models (e.g., neural network models) in order to predict a class label for the user text that corresponds to the embedding vector. Additionally, such a method can use an embedding model that has been trained using relatively more easily-accessed generic training data, rather than more difficult to access and less numerous domain-specific training that would be required to train a model to predict the domain-specific class labels that would be otherwise required.

Yet further, the act of filtering input user text samples to remove non-informative user text (e.g., affirmations, negations, requests for clarification) can provide savings with respect to computational cost of downstream tasks (e.g., NLU model application, embedding model application) and the cost in effort of confirming (or denying/substituting) prospectively-applied class labels. Additionally, the use of a dialog act model as described above to perform such filtering by predicting whether a given sample of user text is either one of a number of non-informative classes of dialog act or out of the context of that set (and thus more likely to be informative) also provides technical benefits. This is at least because, since the model merely attempts to predict whether input is non-informative generic dialog or not, such a model can be smaller and trained on more easily obtainable 'generic' dialog training data.

Other technical improvements may also flow from these embodiments, and other technical problems may be solved.

VIII. EXAMPLE OPERATIONS

Figure 7:
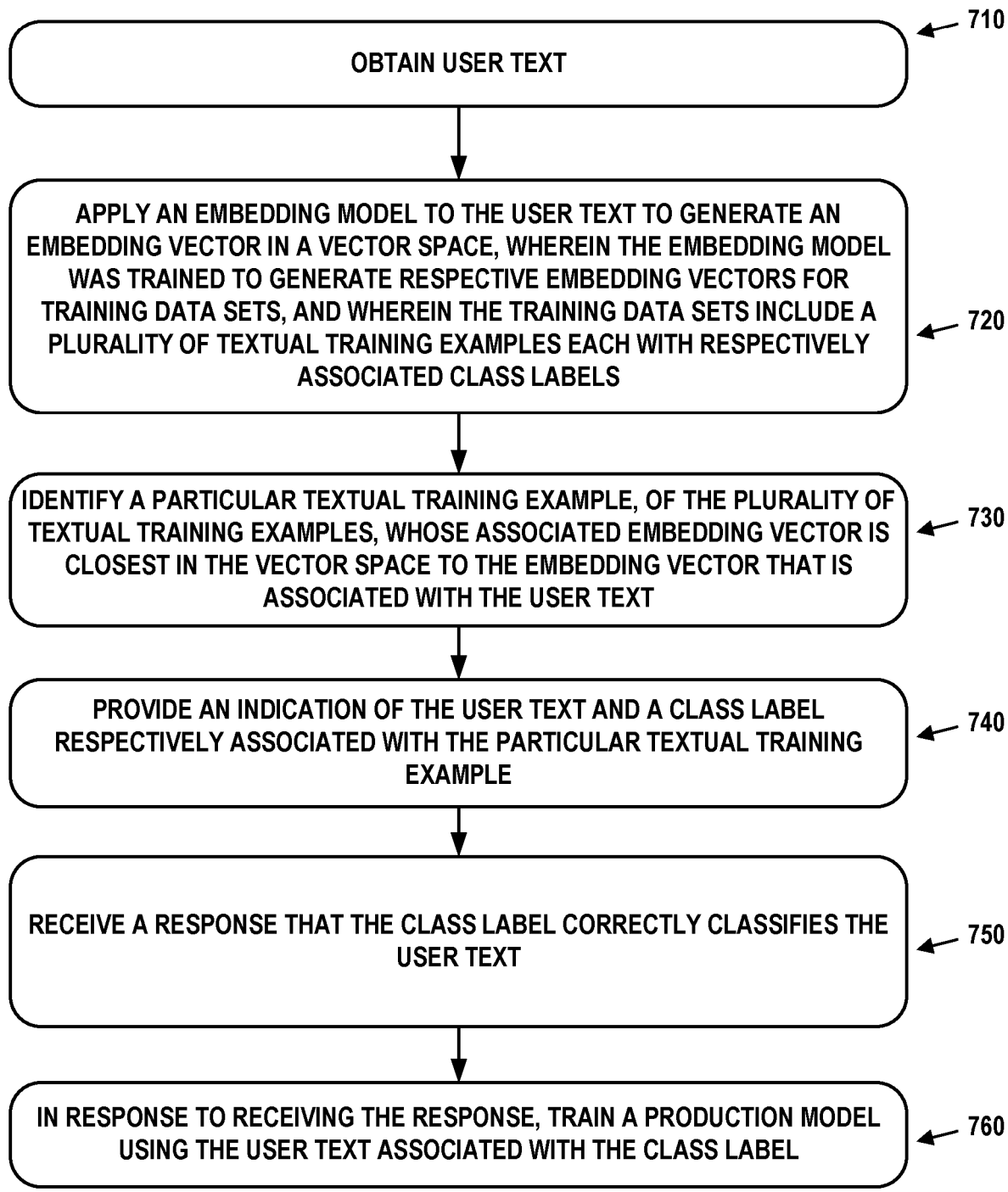
FIG. 7 is a flow chart, in accordance with example embodiments.

FIG. 7 is a flow chart illustrating an example embodiment. The process illustrated by FIG. 7 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

The embodiments of FIG. 7 include obtaining user text (710). User text could be obtained in a variety of ways from a variety of sources. In some examples, the user text could be obtained as part of a support chat between the user and a human or virtual agent. For example, obtaining user text could include providing a virtual agent dialog to a user and obtaining the user text from the user via the virtual agent dialog.

The embodiments of FIG. 7 additionally include applying an embedding model to the user text to generate an embedding vector in a vector space, wherein the embedding model was trained to generate respective embedding vectors for training data sets, and wherein the training data sets include a plurality of textual training examples each with respectively associated class labels (720). The embedding model could be based on a transformer that uses self-attention mechanisms.

The embodiments of FIG. 7 also include identifying a particular textual training example, of the plurality of textual training examples, whose associated embedding vector is closest in the vector space to the embedding vector that is associated with the user text (730). Identifying the particular textual training example whose associated embedding vector is closest in the vector space to the embedding vector that is associated with the user text could include identifying the particular textual training example whose associated embedding vector has a highest cosine similarity to the embedding vector that is associated with the user text. Alternatively, some distance metric other than cosine similarity (e.g., L2 distance, L1 distance) could be used to determine which of the associated embedding vectors is 'closest' in the embedding space.

The embodiments of FIG. 7 further include providing an indication of the user text and a class label respectively associated with the particular textual training example (740). This could include providing a labeling interface to a manual labeler or other user that can be used to present the indication of the user text and class label to the user and to receive inputs from the user. Such an interface could be provided by a web server via HTML or some other internet connection or protocol. Additionally or alternatively, such an interface could be provide by an app or some other purpose-built program.

The embodiments of FIG. 7 yet further include receiving a response that the class label correctly classifies the user text (750). This could include receiving, via a labeling interface provided to a manual labeler or other user, a GUI button press, keyboard keypress, or other indication from the user that the class label correctly classifies the user text. Such a labeling interface could also include the ability to receive, from the user, an indication that the class label does not correctly classify the user text and/or to receive an indication from the user of an alternative label that correctly classifies the user text (e.g., selected from an enumerated list of possible labels and/or a new label input by the user).

The embodiments of FIG. 7 also include, in response to receiving the response, training a production model using the user text associated with the class label (760). This could include applying supervised, semi-supervised, and/or other model training techniques to train the production model using the user text associated with the class label, e.g., using a plurality of user texts and associated class labels determined as described herein. The set of associated class labels could include class labels correctly predicted using the embedding model, class labels selected by a user in response to receiving an indication of class labels incorrectly predicted using the embedding model, class labels automatically generated via some other process (e.g., via the application of an NLP model), and/or labels generated in some other manner. Training the production model can include generating the production model de novo, using the user text and class label data to fine-tune a generic model, and/or using newly obtained user text and class label data to update a production model that had been previously trained.

The embodiments of FIG. 7 could include additional steps or features. In some examples, the embodiments of FIG. 7 could additionally include (i) obtaining additional user text; and (ii) applying a natural language understanding (NLU) model to the additional user text to generate a predicted class label associated with the additional user text, wherein applying the embedding model to the user text to generate the embedding vector in the vector space is performed in response to determining that the NLU model was not applied to the user text to generate a class label for the user text. In such examples, training the production model using the user text associated with the class label additionally comprises training the production model using the additional user text associated with the predicted class label.

In some examples, the embodiments of FIG. 7 could also include: (i) obtaining additional user text; (ii) applying the embedding model to the additional user text to generate an additional embedding vector in the vector space; (iii) identifying an additional particular textual training example, of the plurality of textual training examples, whose associated embedding vector is closest in the vector space to the additional embedding vector that is associated with the additional user text; (iv) providing an indication of the additional user text and an additional class label respectively associated with the additional particular textual training example; and (v) receiving a response that the additional class label incorrectly classifies the additional user text and that the additional user text should be associated with a user-submitted class label, wherein training the production model using the user text associated with the class label additionally comprises training the production model using the additional user text associated with the user-submitted class label.

In some examples, the embodiments of FIG. 7 could further include applying the embedding model to the plurality of textual training examples to generate the respective embedding vectors associated therewith.

In some examples, the embodiments of FIG. 7 could also include: (i) applying the user text to a dialog act model to output a set of probabilities representing a likelihood that the user text belongs to respective different dialog act classes, wherein one of the dialog act classes is an out of domain class, and wherein a remainder of the dialog act classes represent training-irrelevant dialog; and (ii) retaining the user text for use in training the production model based on the set of probabilities. For example, retaining the user text for use in training the production model based on the set of probabilities could include at least one of: based on the set of probabilities, classifying the user text as part of the out of domain class, or determining that none of the probabilities of the set of probabilities exceeds a specified threshold value.

IX. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
obtaining user text;
applying an embedding model to the user text to generate an embedding vector in a vector space, wherein the embedding model was trained to generate respective embedding vectors for training data sets, and wherein the training data sets include a plurality of textual training examples each with respectively associated class labels;
identifying a particular textual training example, of the plurality of textual training examples, whose associated embedding vector is closest in the vector space to the embedding vector that is associated with the user text;
providing an indication of the user text and a class label respectively associated with the particular textual training example;
receiving a response that the class label correctly classifies the user text;
in response to receiving the response, training a production model using the user text associated with the class label;
obtaining additional user text; and
applying a natural language understanding (NLU) model to the additional user text to generate a predicted class label associated with the additional user text, wherein applying the embedding model to the user text to generate the embedding vector in the vector space is performed in response to determining that the NLU model was not applied to the user text to generate any class label for the user text.

2. The method of claim 1, wherein training the production model using the user text associated with the class label additionally comprises training the production model using the additional user text associated with the predicted class label.

3. The method of claim 1, wherein identifying the particular textual training example whose associated embedding vector is closest in the vector space to the embedding vector that is associated with the user text comprises identifying the particular textual training example whose associated embedding vector has a highest cosine similarity to the embedding vector that is associated with the user text.

4. The method of claim 1, further comprising:
obtaining additional user text;
applying the embedding model to the additional user text to generate an additional embedding vector in the vector space;
identifying an additional particular textual training example, of the plurality of textual training examples, whose associated embedding vector is closest in the vector space to the additional embedding vector that is associated with the additional user text;
providing an indication of the additional user text and an additional class label respectively associated with the additional particular textual training example; and
receiving a response that the additional class label incorrectly classifies the additional user text and that the additional user text should be associated with a user-submitted class label, wherein training the production model using the user text associated with the class label additionally comprises training the production model using the additional user text associated with the user-submitted class label.

5. The method of claim 1, further comprising:
applying the embedding model to the plurality of textual training examples to generate the respective embedding vectors associated therewith.

6. The method of claim 1, further comprising:
applying the user text to a dialog act model to output a set of probabilities representing a likelihood that the user text belongs to respective different dialog act classes, wherein one of the dialog act classes is an out-of-domain class, and wherein a remainder of the dialog act classes represent training-irrelevant dialog; and
retaining the user text for use in training the production model based on the set of probabilities.

7. The method of claim 6, wherein retaining the user text for use in training the production model based on the set of probabilities comprises at least one of:
based on the set of probabilities, classifying the user text as part of the out-of-domain class, or
determining that none of the probabilities of the set of probabilities exceeds a specified threshold value.

8. The method of claim 1, wherein the embedding model is based on a transformer that uses self-attention mechanisms.

9. The method of claim 1, wherein obtaining user text comprises providing a virtual agent dialog to a user and obtaining the user text from the user via the virtual agent dialog.

10. A non-transitory computer-readable medium, having stored thereon program instructions that, upon execution by a computing system, cause the computing system to perform operations comprising:
obtaining user text;
applying an embedding model to the user text to generate an embedding vector in a vector space, wherein the embedding model was trained to generate respective embedding vectors for training data sets, and wherein the training data sets include a plurality of textual training examples each with respectively associated class labels;
identifying a particular textual training example, of the plurality of textual training examples, whose associated embedding vector is closest in the vector space to the embedding vector that is associated with the user text;
providing an indication of the user text and a class label respectively associated with the particular textual training example;
receiving a response that the class label correctly classifies the user text;
in response to receiving the response, training a production model using the user text associated with the class label;
applying the user text to a dialog act model to output a set of probabilities representing a likelihood that the user text belongs to respective different dialog act classes, wherein one of the dialog act classes is an out-of-domain class, and wherein a remainder of the dialog act classes represent training-irrelevant dialog; and
retaining the user text for use in training the production model based on the set of probabilities.

11. The computer-readable medium of claim 10, wherein the operations further comprise:
obtaining additional user text; and
applying a natural language understanding (NLU) model to the additional user text to generate a predicted class label associated with the additional user text, wherein applying the embedding model to the user text to generate the embedding vector in the vector space is performed in response to determining that the NLU model was not applied to the user text to generate any class label for the user text.

12. The computer-readable medium of claim 11, wherein training the production model using the user text associated with the class label additionally comprises training the production model using the additional user text associated with the predicted class label.

13. The computer-readable medium of claim 10, wherein retaining the user text for use in training the production model based on the set of probabilities comprises at least one of:
based on the set of probabilities, classifying the user text as part of the out-of-domain class, or
determining that none of the probabilities of the set of probabilities exceeds a specified threshold value.

14. A system comprising:
one or more processors; and
memory, containing program instructions that, upon execution by the one or more processors, cause the system to perform operations comprising:
obtaining user text;
applying an embedding model to the user text to generate an embedding vector in a vector space, wherein the embedding model was trained to generate respective embedding vectors for training data sets, and wherein the training data sets include a plurality of textual training examples each with respectively associated class labels;
identifying a particular textual training example, of the plurality of textual training examples, whose associated embedding vector is closest in the vector space to the embedding vector that is associated with the user text;
providing an indication of the user text and a class label respectively associated with the particular textual training example;
receiving a response that the class label correctly classifies the user text;
in response to receiving the response, training a production model using the user text associated with the class label;
obtaining additional user text;
applying the embedding model to the additional user text to generate an additional embedding vector in the vector space;
identifying an additional particular textual training example, of the plurality of textual training examples, whose associated embedding vector is closest in the vector space to the additional embedding vector that is associated with the additional user text;
providing an indication of the additional user text and an additional class label respectively associated with the additional particular textual training example; and
receiving a response that the additional class label incorrectly classifies the additional user text and that the additional user text should be associated with a user-submitted class label, wherein training the production model using the user text associated with the class label additionally comprises training the production model using the additional user text associated with the user-submitted class label.

15. The system of claim 14, wherein the operations further comprise:
obtaining additional user text; and
applying a natural language understanding (NLU) model to the additional user text to generate a predicted class label associated with the additional user text, wherein applying the embedding model to the user text to generate the embedding vector in the vector space is performed in response to determining that the NLU model was not applied to the user text to generate any class label for the user text.

16. The system of claim 15, wherein training the production model using the user text associated with the class label additionally comprises training the production model using the additional user text associated with the predicted class label.

17. The system of claim 14, wherein the operations further comprise:
applying the user text to a dialog act model to output a set of probabilities representing a likelihood that the user text belongs to respective different dialog act classes, wherein one of the dialog act classes is an out-of-domain class, and wherein a remainder of the dialog act classes represent training-irrelevant dialog; and
retaining the user text for use in training the production model based on the set of probabilities.

18. The system of claim 17, wherein retaining the user text for use in training the production model based on the set of probabilities comprises at least one of:
based on the set of probabilities, classifying the user text as part of the out-of-domain class, or
determining that none of the probabilities of the set of probabilities exceeds a specified threshold value.

* * * * *